United States Patent [19]

Salg

[11] 3,891,113

[45] *June 24, 1975

[54] ELECTRICAL BOX
[75] Inventor: George Salg, River Forest, Ill.
[73] Assignee: Reflect-O-Lite Manufacturing Company, Chicago, Ill.
[ * ] Notice: The portion of the term of this patent subsequent to Nov. 19, 1991, has been disclaimed.
[22] Filed: Nov. 9, 1973
[21] Appl. No.: 414,385

[52] U.S. Cl. .............................................. 220/3.6
[51] Int. Cl.$^2$ ........................................ H02G 3/08
[58] Field of Search ................ 220/3.6, 3.5, 3.7, 3.4

[56] References Cited
UNITED STATES PATENTS

| | | | |
|---|---|---|---|
| 1,400,155 | 12/1921 | Greenburg | 220/3.6 X |
| 1,662,422 | 3/1928 | Hodges | 220/3.6 U X |
| 2,605,806 | 8/1952 | Tinnerman | 220/3.5 |
| 2,842,281 | 7/1958 | Chisholm | 220/3.6 |
| 3,622,029 | 11/1971 | Ware | 220/3.7 |
| 3,659,037 | 4/1972 | MacDonald | 220/3.6 X |
| 3,710,972 | 1/1973 | Barry | 220/3.6 |

FOREIGN PATENTS OR APPLICATIONS

| | | | |
|---|---|---|---|
| 1,560,381 | 2/1969 | France | 220/3.5 |

Primary Examiner—Henry K. Artis
Attorney, Agent, or Firm—Dressler, Goldsmith, Clement and Gordon, Ltd.

[57] ABSTRACT

A molded plastic electrical box proportioned to be inserted into a wall panel opening and retained therein by outwardly extending wall panel face contactors and locking members integral with the sidewall of the box. The locking members are spaced from the panel face contactors by approximately the thickness of a wall panel, and the sidewall is continuous adjacent said locking members, i.e., it has no breaks or slits. The locking members have an inclined cam surface which progressively engages the sidewall of the box as the box is pushed into the opening to gradually flex the sidewall of the box inwardly until the locking members pass the opening, at which time the contactors are positioned in engagement with the face of the panel and the sidewall springs outwardly so that the locking members positively retain the box in place.

7 Claims, 7 Drawing Figures

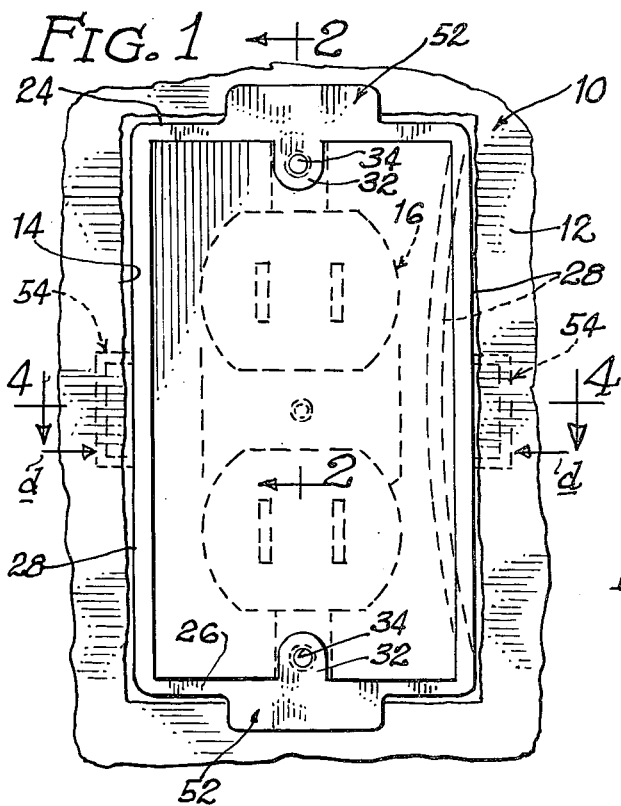
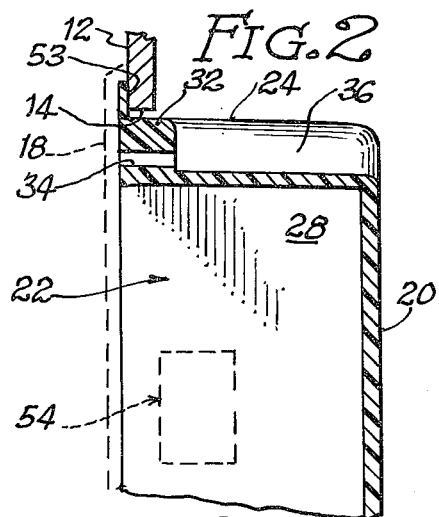
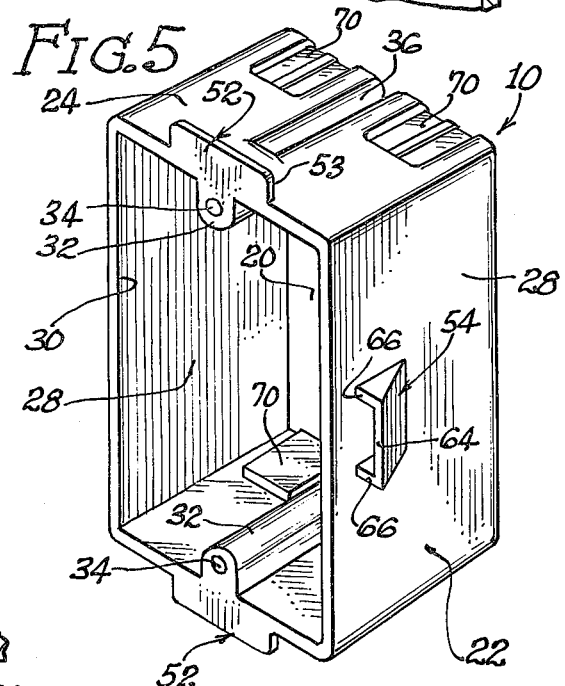
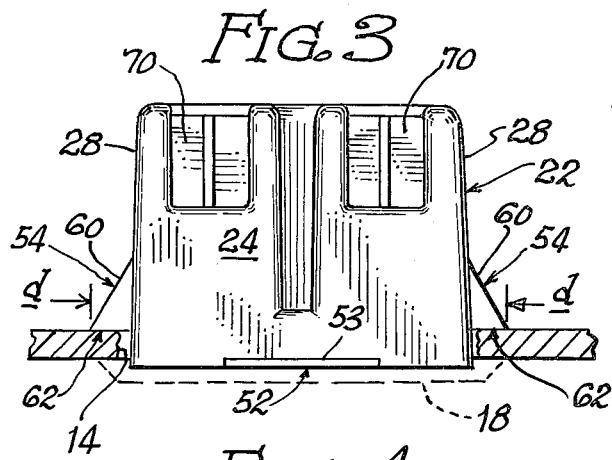
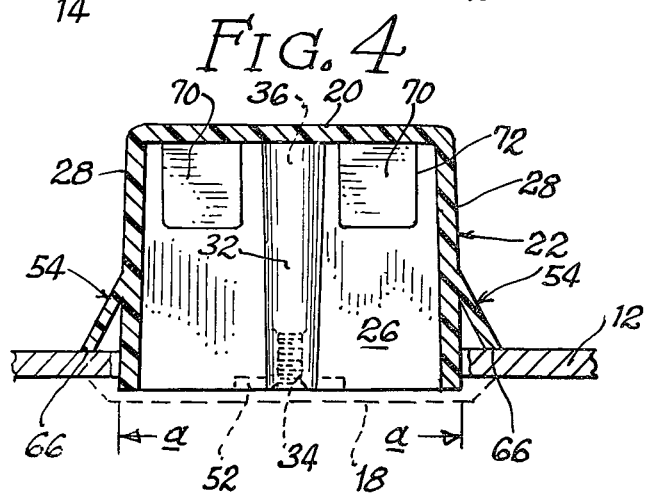

3,891,113

ELECTRICAL BOX

This invention relates to a novel and improved plastic electrical box for mounting electrical components, such as receptacles and switches, and particularly to one which is especially adapted for use in wiring systems for mobile homes and the like.

A large variety of electrical boxes for receiving electrical components have been developed and are available on the market. Some of these are metallic, and others are of plastic and of glass fiber reinforced plastic materials. Most of the boxes currently on the market require the use of extraneous fasteners, such as nails, screws and the like, to secure them to a wall assembly, either to wall paneling or to framing provided for mounting wall paneling. The fastening by nails, screws and the like has been considered necessary because most building codes require electrical boxes to be securely fixed, as by nails or screws, to the wall assembly. That has been so for the metallic boxes that have been used for many, many years, as well as for the plastic boxes which have recently come into use.

In accordance with this invention, an improved plastic electrical box structure is provided. The improved box meets all of the currently applicable UL requirements and is adapted to be directly secured to a wall panel (which may be a wall or a ceiling panel), such as a wood, synthetic hardboard or plasterboard panel, without extraneous fasteners. In each case the paneling is provided with a suitable aperture or opening through which the box may be inserted so that it is recessed, in the usual fashion, behind the panel for receipt of an electrical component, such as a receptacle, switch or fixture, and so that electrical conductors may be brought to the box behind the panel through knockouts provided by the box structure.

The box structure itself comprises an integral back wall and a sidewall extending forwardly of the back wall to define with the back wall, a hollow, open box structure having an expansive open front which is spaced from the back wall. The hollow, open box structure defines an open space for housing a receptacle, switch or the like and serves to shield the receptacle, switch or the like from the exterior of the box and provides a plurality of knockout portions formed therewith along weakened lines of connection. The box structure further provides an integral wall panel mounting means comprising contactors for controlling the depth of entry of the box structure when it is inserted through a wall panel opening from the front of the wall panel into the space behind the wall panel and for engaging the front surface of said wall panel when the box is secured to the wall panel. The mounting means further comprises panel locking means mounted on, and integral with the sidewall of the box, the locking means being spaced rearwardly of the contactors and laterally away from the contactors. The locking means provides a front edge for engaging the back surface of the wall panel when the box structure is secured to a wall panel and the locking means merges with the sidewall. The sidewall is continuous and without breaks or slits in the sidewall adjacent the panel locking means to minimize the possibility of fire or sparks escaping the box through such slits or breaks, thereby minimizing the potential fire hazard which would result from open slits or spaces in the sidewall.

The panel locking means and the contactors extend outwardly of the box and away from said hollow space. The locking means is positioned to be cammed inwardly of the hollow space and to flex the sidewall in a region remote from the contactors but without flexing the sidewall regions located at said contactors as the box is inserted into and pushed through a wall panel opening following which the locking means resiliently moves outwardly after the contactors have engaged the front surface of said wall panel. The locking means defines a forwardly and outwardly sloping camming surface to engage the periphery of the wall panel opening so that as the box is pushed through the opening the locking means causes the sidewall portion to be deflected inwardly of the hollow space. The locking means is proportioned and positioned to return to an original position outwardly of the hollow space so that the front edge of the locking means is positioned behind the wall panel to prevent removal of the box forwardly of the wall panel opening. Thus, a box of this invention is configured so that when a wall panel is disposed between the contactors and the locking means, the box structure may not readily be moved either inwardly or outwardly of the wall panel. The box minimizes fire hazards, satisfactorily secures the box against accidental removal and thereby satisfies both most code requirements and UL requirements.

A preferred box structure of this invention incorporates a locking means comprising a pair of spaced apart locking elements, each of which is on a sidewall portion remote from and opposite from the other and remote from the contactors. In this case each locking element causes a different and remote portion of the sidewall to flex inwardly as said box is inserted into and pushed through the panel opening. Where the box is generally rectangular, the sidewall comprises four portions intersecting at right angles, two opposite sides of which bear the contactors and the other two opposite sides of which mount the locking elements.

In a further embodiment the panel locking means comprises a locking element on one sidewall portion and a second locking member on an opposite sidewall portion, the second locking member in one case being a front face portion of a recessed box extension which is positioned behind said wall panel.

Such electrical boxes are quickly, easily and firmly secured directly to a wall panel without fasteners, making it possible to complete the installation of a wall assembly, including the mounting of the paneling, prior to securing electrical boxes thereto. With prior art constructions requiring extraneous fasteners, most frequently electrical boxes are secured to studs, or furring strips or other framing, after which the wall paneling is secured to the framing. That is not necessary in accordance with this invention, a great advantage, particularly for the mobile home industry. Furthermore, the electrical boxes of this invention satisfy all current UL requirements.

These and other objects, features and advantages of this invention will become apparent from the following description and drawings, of which:

FIG. 1 is a front elevation of a wall assembly in which a typical electrical box of this invention has been installed;

FIG. 2 is a fragmentary cross-sectional view taken substantially along the line 2—2 of FIG. 1;

FIG. 3 is a plan view of the assembly of FIG. 1;

FIG. 4 is a fragmentary cross-sectional view taken substantially along the line 4—4 of FIG. 1;

FIG. 5 is a perspective view of the electrical box structure of FIG. 1;

Figure 6:
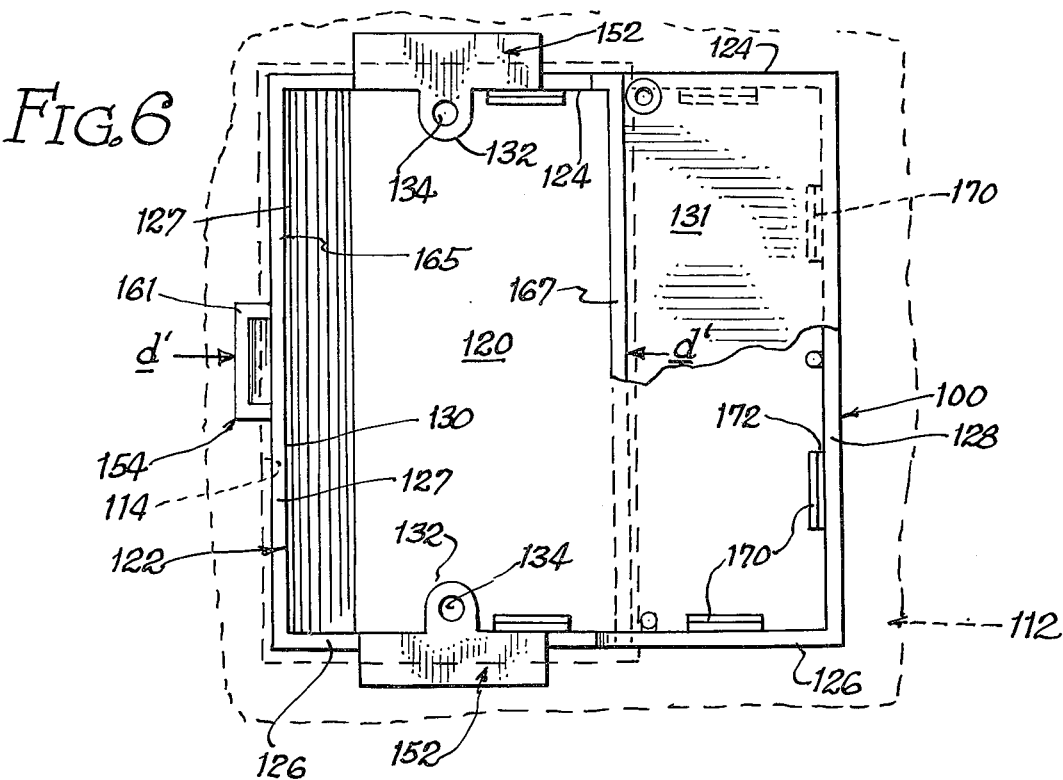
FIG. 6 illustrates a further electrical box of this invention.

Referring now to FIGS. 1 to 5, an electrical box assembly of this invention comprises an electrical box 10 adapted to be secured to a wall panel 12 in an appropriately formed or cut-out wall panel opening 14. The electrical box 10 is proportioned to mount a conventional electrical component, such as a receptacle 16, which is covered, as by a conventional cover plate 18. Box 10 is formed of a suitable plastic material, such as a thermoplastic acrylonitrile-butadiene-styrene, and is preferably molded.

The box 10 comprises a back wall 20 and sidewall 22 which has portions which are somewhat flexible and deflectible. In the embodiment of FIGS. 1–5, the sidewall 22 is rectangular and consists of four portions intersecting at right angles, namely a top portion 24, a bottom portion 26 and side portions 28. Portions 24, 26 and 28, together with back wall 20, form a hollow open box structure defining an expansive open front 30 spaced from and forwardly of the back wall 20. Although an electrical box 10 has been illustrated as being generally rectangular and adapted to mount a single electrical component, electrical boxes in accordance with this invention may be of other rectangular shapes, such as square, as well as round, octagonal or of any other conventional shape, and may also be adapted to mount two or more electrical components.

Box 10 provides mounting bosses 32 defining screw holes 34 proportioned to receive threaded fasteners for securing a receptacle 16 or the like to the box as is illustrated in FIG. 1. Bosses 32 terminate rearwardly in open channels 36 (when viewed from the outside of the box) to receive the ends of the fasteners. Channels 36 are defined by top and bottom wall portions 24 and 26, respectively, and the insides of the channel formations define ribs which serve to strengthen and rigidify box 10 and which prevent the flexing of sidewall portions 24 and 26.

Electrical box 10 provides a wall panel mounting assembly which is integrally molded therewith. Panel mounting assembly includes at least two panel face contactors 52 defining rear contactor faces 53 and cooperating panel locking means. In the case of the embodiment of FIGS. 1 to 5, the locking means comprises a pair of lock elements 54. Lock elements 54 are spaced rearwardly of the panel face contactors so that when box 10 is secured to the wall panel 12, the contactor faces 53 confront the front surface of the wall panel, and the lock elements 54 confront the back surface of the wall panel, both adjacent the periphery of aperture 14.

The lock elements are integrally formed generally centrally of the side portions 28, i.e., generally intermediate the length of side portions 28 and on sidewall portions laterally of and remote from the contactors 52. Lock elements 54 are positioned on sidewall portions which are relatively long so that the side portions may be cammed inwardly (as illustrated in dotted line at the right side in FIG. 1) without destroying the integrity of the wall panel opening 14 and without destroying box 10 as the box 10 is secured to wall panel 12.

Lock elements 54 merge with and into side portions 28. No slits or other breaks in the sidewalls at the lock elements 54 are provided, thereby to maintain the hollow open space in box 10 in as enclosed a condition as is possible, thereby to satisfy all of the currently applicable UL requirements.

Lock elements 54 each comprise a forwardly sloping cam surface 60 which is adapted to engage the periphery of the panel opening 14 and which is proportioned to cooperate therewith to deflect the side portions 28 inwardly of the box 10. Lock elements 54 terminate forwardly in a front edge 62 which is positioned to confront a back surface portion of wall panel 12 adjacent opening 14 when the lock elements 54 have reached the position illustrated by FIG. 1. Front edge 62 is formed of an outer edge portion 64 and lateral edge portions 66, the latter merging with side portions 28 to define an enclosed pyramidal configuration open at the front. Side portions 28 are sufficiently flexible and resilient so that when they are forced inwardly, as cam surfaces 60 are urged inwardly by peripheral edge portions of an opening 14, they will resiliently flex inwardly but will resiliently return to the positions illustrated in FIG. 1 when the lock elements 54 pass through the opening 14 and expand into position behind the wall panel.

As seen in the drawings, a box 10 may be secured to a wall panel in an appropriately cut-out opening in a panel by positioning the lock portion of a box 10 in an opening 14, thence by pushing it rearwardly through the opening until cam surfaces bear against the periphery of the opening 14 and cam the side portions inwardly, and until the box 10 reaches the position of FIG. 1. At that time, side portions 28 will re-flex outwardly to their outermost positions, lock elements 54 will be in their panel mounting positions and the panel opening periphery will be positioned between panel face contactors 52 and lock elements 54, the contactors controlling the depth of entry of the box into the space behind the panel. Where the wall panel 12 is of a thickness substantially equal to the depthwise distance between the contactors 52 and the lock elements 54, the wall panel 12 will be tightly gripped adjacent the periphery of the opening 14. Where the panel thickness is somewhat less than the depthwise distance between contactors 52 and the lock elements 54, a looser, but nonetheless a retentive engagement will be provided.

It will be seen that the lock elements are on opposite sides and are spaced away from the contactors 52 and from the sidewall portions bearing contactors 52. This permits the sidewall portions bearing the lock elements to flex without the application of unusually high force, thereby to minimize damage to the periphery of the opening as the lock elements pass therethrough. Preferably the lock elements are on mid portions and at opposite sides, thereby to take advantage of the flexing capacity of the wall portions and also to prevent canting of the box as it is pushed through opening 14.

The contactors 52 and lock elements 54 are positioned on box 10 so that when their rear and front surfaces, respectively, are positioned against the front and back surfaces, respectively, of wall panel 12, the sidewall 22 will project just slightly beyond the wall panel 12 (see FIGS. 3 and 4). That position will be maintained when a cover plate 18 is secured to the box structure 10 or to the electrical component, so that the sidewall 22 will provide shielding for the paneling adjacent the periphery of the opening, to protect against fire due to overheating or the like.

Box 10 also provides suitable knock-outs 70. Preferably the knock-outs are molded along weakened lines of connection such as thinned peripheral edges 72 so that they may be broken away from box 10, as by punching them out.

Figure 7:
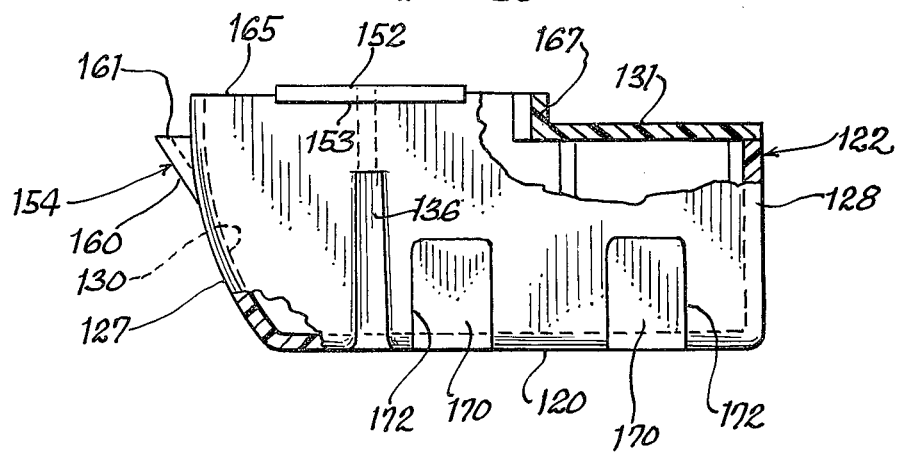
FIG. 7 is a plan view of the box of FIG. 6.

Referring now to the embodiment of FIGS. 6 and 7, a further electrical box assembly of this invention comprises an electrical box 100 adapted to be secured to a wall panel 112 in an appropriately formed or cut-out wall panel opening 114. The electrical box 100 is proportioned to mount a conventional electrical component. Box 100 is also molded of a suitable plastic material.

The box 100 comprises a back wall 120 and a somewhat flexible and deflectible sidewall 122. Sidewall 122 consists of a top portion 124, a bottom portion 126 and side portions 127 and 128. Portions 124, 126, 127 and 128, together with back wall 120, form a hollow open box structure defining an expansive front opening 130 spaced from and forwardly of the back wall 120 and a closed front portion 131.

The box 100 provides mounting bosses 132 defining screw holes 134 proportioned to receive threaded fasteners for securing a receptacle or the like to the box. Bosses 132 terminate rearwardly in open channels 136 (when viewed from the outside of the box) to receive the ends of the fasteners. Channels 136 are defined by top and bottom portions 124 and 126, respectively, and the insides of the channel formations define ribs which serve to strengthen and rigidify box 100. The ribs and the presence of the front portion 131 tends to prevent the flexing of wall portions 124, 126 and 128.

Electrical box 100 provides a panel mounting assembly which is integrally molded therewith. The panel mounting assembly includes at least two panel face contactors 152 having rear contactor faces 153, and cooperating panel locking means comprising lock element 154 which cooperates with front portion 131. Front portion 131 may be integrally molded with the box or may be an inset portion suitably adhered to sidewall portions 124, 126 and 128. Front portion 131 serves as a further locking member. Lock element 154 is spaced rearwardly of the panel face contactors so that when box 100 is secured to the wall panel 112, the contactors 152 confront the front surface of the wall panel, and the lock element 154 confronts the back surface of the wall panel, both adjacent the periphery of opening 114.

The lock element is integrally formed generally centrally of the side portions 127, i.e., generally intermediate the length of side portion 127, and on a sidewall portion remote from the contactors 152. Lock element 154 is positioned on a sidewall portion which is relatively long and which is not reinforced against flexing as are wall portions 124, 126 and 128, so that the sidewall portion may be cammed inwardly without destroying the periphery of the wall panel opening 114 or without destroying box 100 as the box 100 is pushed through wall panel opening 114.

Lock element 154 merges with and into side portion 127. No slits or other breaks in the sidewall at the lock element 154 are provided, thereby to maintain the hollow open space in box 100 in as enclosed a condition as is possible, thereby to satisfy all of the applicable UL requirements. Like lock element 54, lock element 154 provides an upwardly sloping cam surface 160 which is adapted to engage the periphery of the panel opening 114 and which is proportioned to cooperate therewith to deflect the side portion 127 inwardly of the box 100. Lock element 154 terminates forwardly in a front edge which is positioned to confront a back surface portion of wall panel 112 adjacent opening 114 when the lock element 154 has reached the position illustrated by FIG. 6. The front edge is formed of an outer edge portion and lateral edge portions, the latter merging with side portion 127 to define an enclosed pyramidal configuration open at the front. Side portion 127 is sufficiently flexible and resilient that when the box 100 is forced inwardly of opening 114, cam surface 160 will be urged inwardly by the peripheral edges of the opening 114 and portion 127 will resiliently flex but will return to the positons illustrated in FIGS. 6 and 7 when the lock element passes through the opening 114 and expands into position behind the wall panel.

A box 100 may be secured to a wall panel in an opening 114 by first inserting the enclosed side, the side having the side portion 128 and defining the box extension into the opening 114, and by then rotating the box gradually to bring the front locking surface portion 131 towards the back surface of the panel, thereby to position the box extension behind the panel. As this occurs, camming surface 160 will finally contact the edge of the opening 114 and will force the sidewall portion 127 to flex inwardly (as was the case with sidewall portions 28) as the box is pushed inwardly until the front edge of lock element 154 lies behind the panel. At that time side portion 127 will flex outwardly and the lock element will serve to lock the box in position in the wall panel, with the box extension being in a recessed position behind the wall panel. In this embodiment the width of the opening 114 is such that front portion 131 bears against the back surface of the panel as does the front face of lock element 154. This serves to provide oppositely positioned locking means which, with contactors 152, serve to hold the box 100 to the panel. It should be noted that the front surface of front portion 131 is spaced rearwardly of edge 165 the same distance which the front surface 161 of lock element 154 is spaced rearwardly of edge 165.

Of course the width of opening 114 is such that the box may not move laterally a distance greater than the lateral extent of the lock element 154. In other words, the opening is of a width at the elevation of the locking element 154 which is less than the distance $d'—d'$, the distance between the edge of the locking element 154 at the front and edge segment 167. In the case of the embodiment of FIGS. 1 to 5, the width of the opening 114 at the elevation of the locking elements 154 is less than distance $d—d$ but greater than the distance $a—a$.

Panel face contactors 152 and lock element 154 and front portion 131 embrace and grip opening 114 in the same manner as do contactors 52 and lock elements 54.

Box 100 also provides suitable knock-outs 170. Preferably the knock-outs are molded along thinned peripheral edges 172 so that they may be broken away from box 100, as by punching them out.

While this invention is susceptible of embodiment in many different forms, there has been shown and described in detail presently preferred embodiments of the invention, with the understanding that the present disclosure is intended to be an exemplification of the principles of the invention, and not to be limiting upon the invention. The scope of the invention will be pointed out in the appended claims.

I claim:

1. A molded plastic, hollow electrical box adapted to be inserted in an opening in a wall panel and to be secured thereto without extraneous fasteners, said box being a integral, one-piece structure and comprising an integral back wall and a sidewall forwardly of said back wall and forming with said back wall an open box structure defining an expansive open front forwardly of said back wall and circumscribing a hollow space therewithin, a plurality of knock-out portions formed with said box along weakened lines of connection, and an integral wall panel mounting means comprising panel face contactors for controlling the depth of entry of said box structure when it is inserted through a wall panel opening from the front of said wall panel into the space behind the wall panel and for engaging the front face of said wall panel when the box is secured to said wall panel, said mounting means further comprising panel locking means mounted on, and integral with a portion of the sidewall of said box and spaced rearwardly of said contactors and laterally away from said contactors and providing a front edge for engaging the back surface of said wall panel when the box is secured to said wall panel, said panel locking means merging with said sidewall and said sidewall being continuous, and without breaks or slits in said sidewall portion adjacent said panel locking means, said panel locking means and said contactors extending outwardly of said box and away from said hollow space, said locking means being positioned to be cammed inwardly of the hollow space and to flex the portion of the sidewall carrying said locking means in a region remote from said contactors and without flexing the sidewall portions located at said contactors inwardly of the hollow space as said box is inserted into and pushed through said wall panel opening and then resiliently to be moved outwardly when said contactors have engaged the front face of said wall panel, said locking means defining a forwardly and outwardly sloping camming surface to engage the periphery of said wall panel opening so that as said box is pushed through said opening said locking means will cause the portion of said sidewall carrying said locking means to be deflected inwardly of said hollow space, said locking means being proportioned and positioned to return to an original position outwardly of said hollow space so that said front edge is positioned behind said panel to prevent removal of said box forwardly of said wall panel opening, so that when a wall panel is disposed between said contactors and said locking means, said box may not readily be moved either inwardly or outwardly of said wall panel.

2. A molded plastic, hollow electrical box in accordance with claim 1 in which said locking means comprises a pair of spaced apart locking elements, each being on said sidewall at portions remote from and opposite each other and remote from said contactors, each causing a different and remote portion of said sidewall to flex inwardly as said box is inserted into and pushed through said wall opening.

3. A molded plastic, hollow electrical box in accordance with claim 2 in which each said locking element comprises a generally planar camming surface and lateral edge portions which merge with said sidewall portion.

4. A molded plastic, hollow electrical box in accordance with claim 2 in which said box is generally rectangular and said sidewall comprises four wall portions intersecting at right angles, two opposite side portions bearing said contactors and the other two opposite side portions mounting said locking elements.

5. A molded plastic, hollow electrical box in accordance with claim 4 in which said side portions bearing said contactors provide reinforcing ribs which resist flexing.

6. A molded plastic, hollow electrical box in accordance with claim 1 in which panel locking means comprises a locking element on one sidewall portion and a second locking member on an opposite sidewall portion.

7. A molded plastic, hollow electrical box in accordance with claim 6 in which said second locking member is the front face portion of a recessed box extension positioned behind said wall panel.

* * * * *